United States Patent [19]

Malcik et al.

[11] 3,722,701

[45] Mar. 27, 1973

[54] MODULAR FILE ELEMENT AND COMPONENTS THEREOF

[75] Inventors: Frank John Malcik, Berwyn, Edward William Whittemore, John Patrick Clark, both of Elmhurst, all of Ill.

[73] Assignee: Swingline, Inc., Long Island City, N.Y.

[22] Filed: May 7, 1971

[21] Appl. No.: 141,317

[52] U.S. Cl...........211/177, 287/54 B, 287/189.36 A
[51] Int. Cl.................................................A47f 5/10
[58] Field of Search........211/177, 148; 287/56, 54 B, 287/189.36 A, 189.36 C, 189.36 H; 285/105

[56] References Cited

UNITED STATES PATENTS

| | | | |
|---|---|---|---|
| 823,451 | 6/1906 | Sweeney et al. | 287/54 B |
| 1,393,679 | 10/1921 | Forster | 287/20.924 |
| 1,563,137 | 11/1925 | Amsler | 211/177 X |
| 1,484,856 | 2/1924 | Zilisch | 211/177 |
| 2,017,626 | 10/1935 | Kohnke | 287/54 B |
| 2,512,725 | 6/1950 | Mock | 343/797 |
| 1,950,635 | 3/1934 | Steinmayer | 287/54 B |
| 3,034,185 | 5/1962 | Olsen | 287/54 B X |
| 3,606,023 | 9/1971 | Edmunds | 211/177 X |

Primary Examiner—Nile C. Byers, Jr.
Attorney—I. Walton Bader

[57] ABSTRACT

A joint structure for use in a filing rack of the type which may be utilized to support loose-leaf binders or the like in hanging relationship is disclosed. The joint structure is constructed to retain two rod-like elements of a rack structure together. The joint structure includes a hollow support member having two pairs of aligned holes for receiving the rod-like elements and a specially constructed locking means which coacts with a specially configured arrangement of grooves in the rod-like elements interior of the hollow support member to retain the rod elements in place relative to each other and relative to the hollow support member.

10 Claims, 10 Drawing Figures

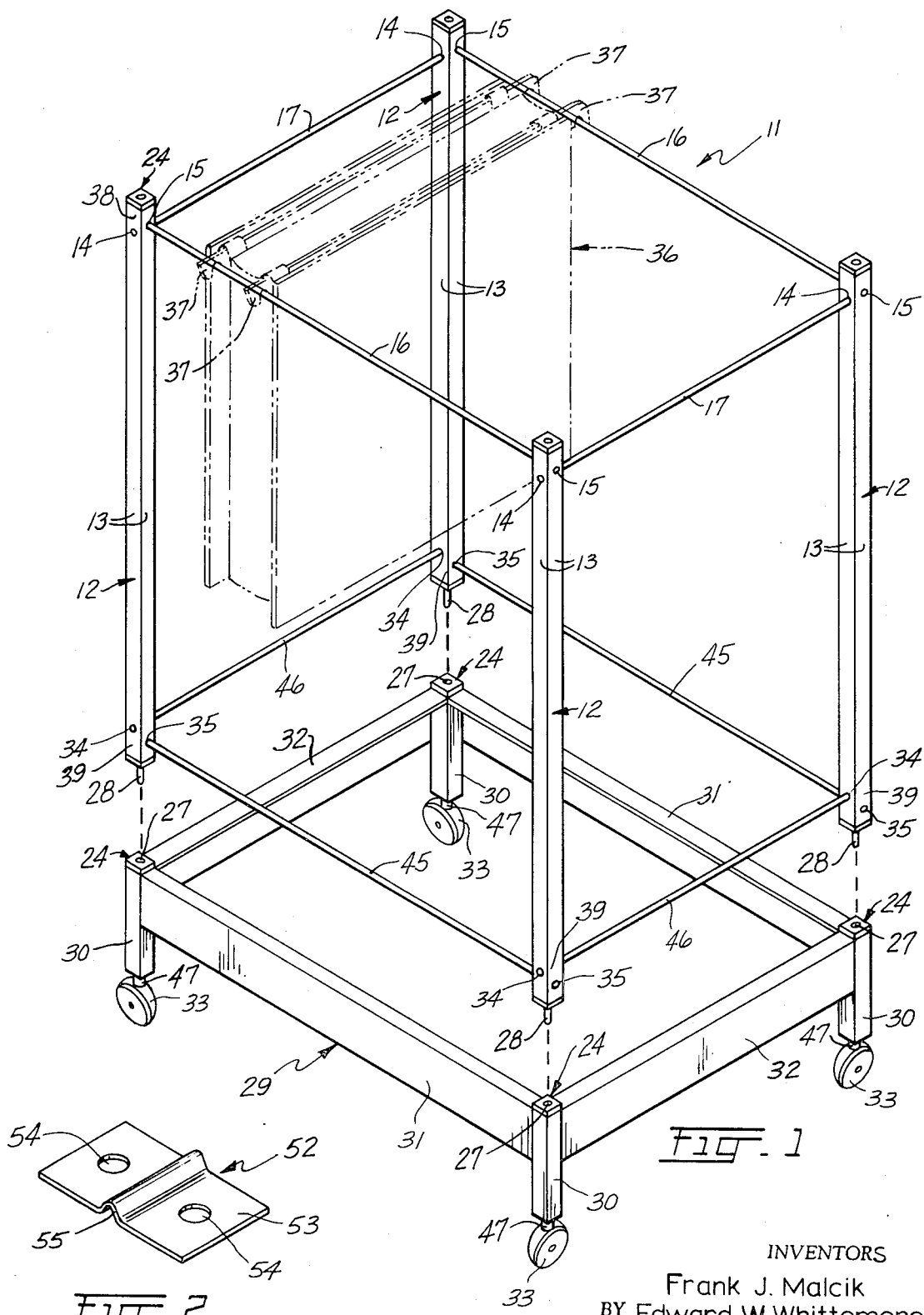

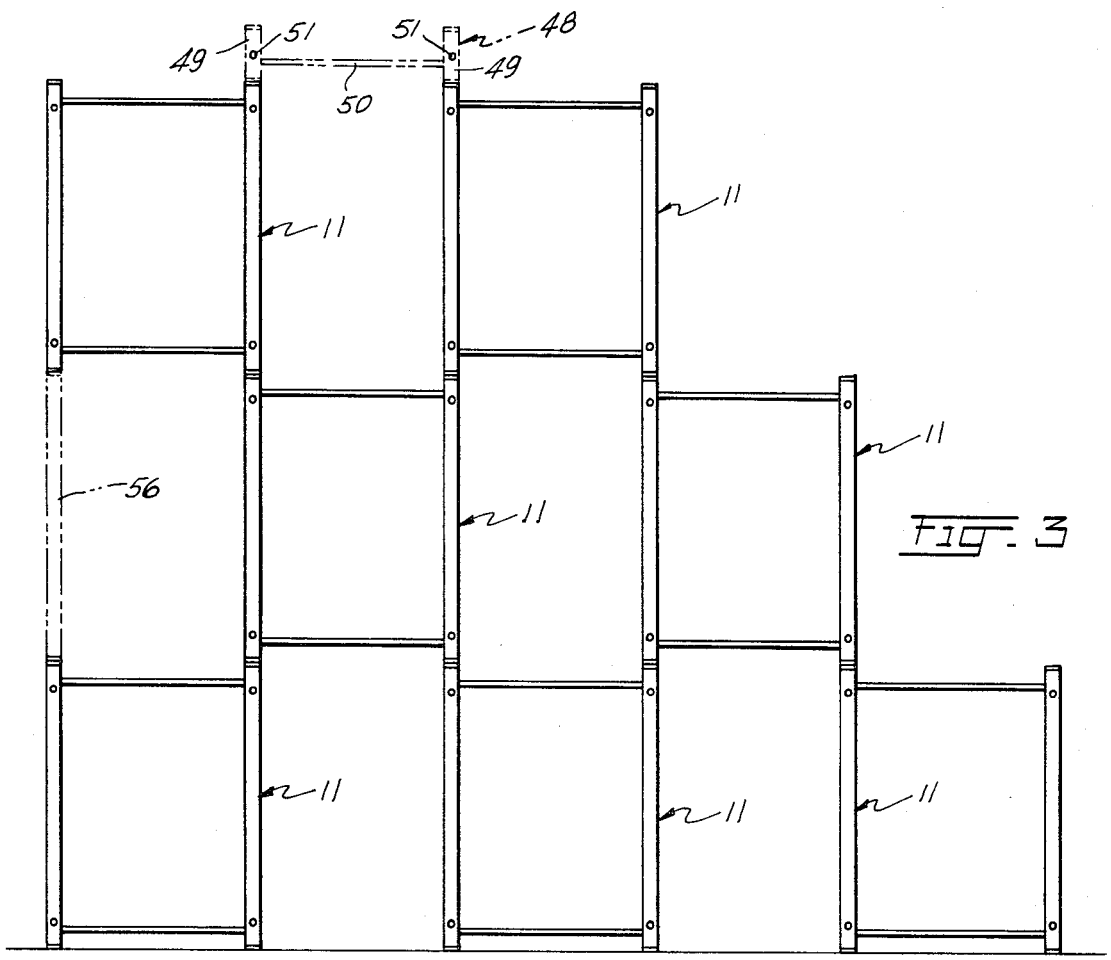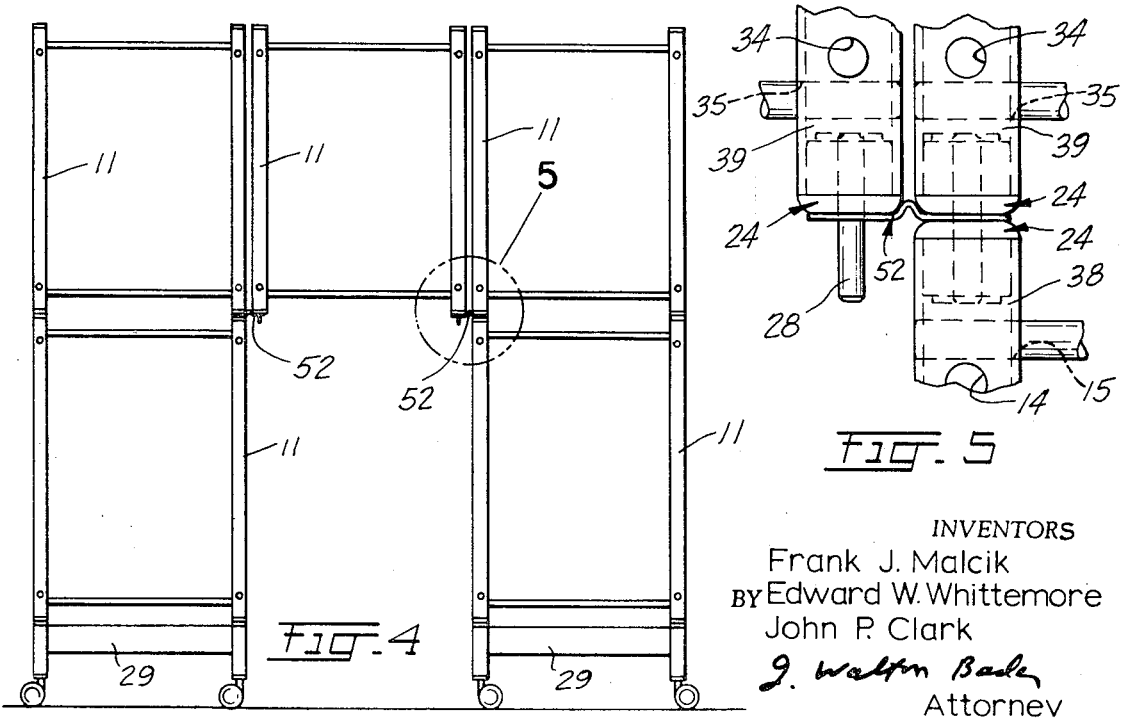

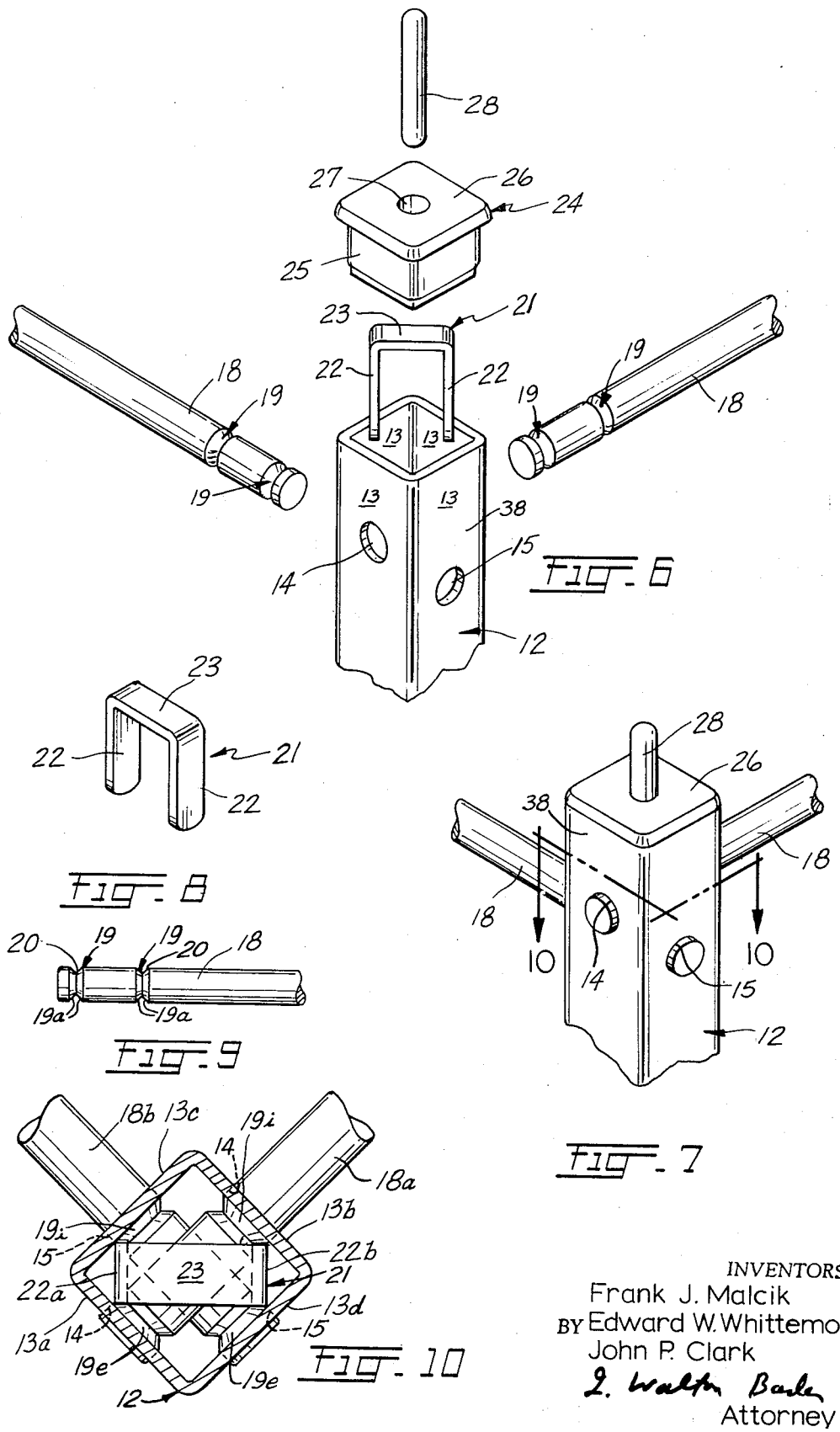

MODULAR FILE ELEMENT AND COMPONENTS THEREOF

BACKGROUND OF THE INVENTION

This invention relates to filing racks for record elements and in particular to a joint structure for connecting file carrying rod-like elements of a rack together. This invention is specifically useful in the filing of large amounts of records such as those produced by computer print-out.

Generally computer print-out output is of large quantity and, after being studied, must be filed. The output is generally placed in post binders which then must be placed into some type of filing device.

Since binders filled with computer print-out sheets are heavy it is preferable to utilize suspended filing techniques where such binders are supported in hanging relationship on parallel rod-like elements of a suitable rack. However, there has not been a convenient rack structure heretofore made to do so. The present invention provides a specially constructed joint structure which permits the convenient assembly of individual modular units which can be used both as individual filing racks suitable for suspended filing of loose-leaf binders and the like and in combination with other identical modular units to form a composite rack structure suitably configured to meet the special needs of a particular application.

SUMMARY OF THE INVENTION

In accordance with the teachings of the present invention a joint structure for use in a filing rack is provided. In construction the joint structure includes a hollow support member and a locking means disposed internally of the support member for connecting together two rod-like elements each of which extends through a pair of aligned openings in the support member. The pairs of openings are disposed in overlying relationship to each other and each rod-like element has a pair of spaced apart grooves located interiorly of the support to cooperatively engage the interiorly located locking means to hold the rod-like elements together.

BRIEF DESCRIPTION OF THE DRAWINGS

FIG. 1 is an perspective view of a modular file rack constructed according to this invention also showing a post binder supported thereon in hanging relationship.

FIG. 2 is a perspective view of a part of the joint structure according to this invention which permits modular rack units to be joined in side by side relationship.

FIG. 3 is a elevation view of a plurality of modular filing elements constructed according to this invention disposed in vertically stacked relationship.

FIG. 4 is a elevation view of a plurality of modular filing racks constructed according to this invention disposed in vertically stacked relationship and with a modular filing rack connected to the vertically stacked units in side-by-side relationship.

FIG. 5 is a detail side elevational view, on an enlarged scale, of the area 5 of FIG. 4.

FIG. 6 is an exploded perspective view of the joint structure according to this invention.

FIG. 7 is a perspective view of the joint structure shown in FIG. 6 in assembled condition.

FIG. 8 is a perspective view of the locking means utilized in a joint structure according to this invention.

FIG. 9 is a plan view of a rod-like element of the joint structure according to this invention.

FIG. 10 is a cross sectional view, on an enlarged scale, taken along lines 10—10 of FIG. 7.

DETAILED DESCRIPTION OF THE INVENTION

As shown in FIG. 1, the modular file rack or unit 11 constructed according to this invention is composed of four upstanding hollow support members 12 of each of which, in the construction shown, has a generally square cross-section and is formed with a plurality of rectangular sides 13. As best shown in FIGS. 6 and 7 at the upper end portion 38 of each support member 12 opposing sides 13 are provided with pairs of aligned openings 14 and 15 located at different height levels along the support member. In the construction shown, the support member has a square cross-section so that openings 14 and openings 15 are positioned in perpendicular relationship relative to each other. As shown, openings 14 adjacently overlie openings 15.

Referring again to FIG. 1 at the lower end portion 39 of each support member 12 opposing sides 13 are provided with pairs of aligned openings 34 and 35 which occupy the same positioned relationship relative to each other as the corresponding openings 14 and 15 respectively in the upper end portion of support member 12 previously described.

Support members 12 are connected together in the manner shown to form a rack by rods 16 and 17 at their upper ends and by rods 45 and 46 at their lower ends. Each end 18 of each of these rods is, as best shown in FIGS. 6 and 7, provided with a pair of spaced V-shaped grooves 19 with the included angle between groove faces 19a being approximately 90°. To form the rack each end 18 of each rod is inserted through an appropriate pair of aligned openings in the support member. Grooves 19 in each end of a rod are spaced apart by a distance such that when a rod is inserted into an appropriate pair of aligned openings both grooves 19 are located interiorly of the hollow support member as best shown in FIG. 10. In the construction shown the distance between the farthest removed points 20 of spaced grooves 19 is approximately equal to the distance between the inside surfaces of opposing sides of a support member.

As mentioned previously members 12 are hollow and are open at the top portion 38 and at the bottom portion 39. A cap 24 is adapted to fit within the open top portion 38 and open bottom portion 39 of each support member 12. Cap 24 consists of body portion 25 and of overlying top portion 26 and fits into the support member 12 like a plug with the body portion disposed within the support member and the top portion overlying the end of the support member. Top portion 26 is provided with an opening 27 for receiving a pin 28 which projects above top portion 26 for a purpose which will be described hereinafter.

For the purpose of retaining the end portions 18 of rods 16, 17, 45 and 46 within the appropriate openings in the support members 12 a locking means is provided. In the construction shown, this means comprises a clip or shackle 21 which includes a bridge portion 23 and a pair of legs 22 depending downwardly from opposite ends of bridge 23.

The shackle 21 coacts with the grooves 19 in two rod ends 18 extending in intersecting and in over-and-under relationship through aligned openings in an end of a support member 12 to thereby act as a shackle tying the two rod ends together. The nature of cooperation and coaction between shackle 21 and rod ends 18 can be best seen in FIG. 10. With reference to FIG. 10 rod end 18a extends through the overlying aligned openings 14 in opposing sides 13a, 13b, respectively, of support member 12. Rod end 18b, as shown, extends through aligned openings 15 in sides 13c and 13d, respectively, of support member 12. Thereby rod end 18a overlies rod end 18b in perpendicular intersecting relationship thereto. With its legs 22 facing downward and with its bridge 23 extending diagonally in relation to the square defined by the cross-section of support member 12, clip 21 is inserted into the support member so that its bridge portion overlies the rod ends 18a, 18b in contact with overlying rod end 18a and so that each of its legs engage in mating relationship one groove of one rod end and one groove of the other rod end. Thus in the construction shown, leg 22b of clip 21 engages the endmost groove 19e of rod end 18b and the inner most groove 19i of rod end 18a. Leg 22a of clip 21, on the other hand, engages the endmost groove 19e of rod end 18a and the innermost groove 19i of rod end 18b. It is, of course, also possible to insert clip 21 so that one of its legs engages the innermost groove 19i in rod end 18a and the innermost groove 19i in rod end 18b with its other leg engaging the endmost grooves 19e of the respective rod ends. This is accomplished simply be inserting clip 21 so that its bridge 23 extends along the other diagonal of the square defined by the cross-section of support member 12.

A file or record book 36, including a plurality of hooked members 37 may be optionally retained in hanging relationship upon members 16 as shown in FIG. 1.

A base 29 may optionally be provided which includes a plurality of hollow upstanding members 30, each of which have a cap 24 disposed thereupon and a caster 33 carried by support 47.

A pair of members 31 join opposite members 30 to each other and an additional pair of members 32 also join opposite members 30 to one another. The opening 27 in the cap 24 disposed upon the top portion of each of members 30 is adapted to accommodate the same pin 28 which is disposed within opening 27 located within cap 24 disposed in the bottom of the corresponding upstanding support member 12 of the modular rack 11. Thus the modular rack 11 is firmly connected to base 29 but can be easily removed therefrom.

It is also possible to connect a series of modular racks to one another to form an interconnected stacked arrangement as shown in FIG. 3. In this figure, the modular units are disposed one above the other and joined together in this position by pins 28 disposed within the openings 27 of abutting cap members 24. As shown in FIG. 3, an area can be provided wherein one side is incomplete. To complete this area an additional support member 56 (indicated by phantom lines) can be provided which is identical in construction to each of support members 12 except that it does not include the openings 14, 15, 34 and 35. Cap members 24 are disposed in the ends of support 56 and pins 28 extend through holes 27 in abutting cap members to hold support 56 in place.

Also, in the area shown in FIG. 3 a top of the interconnected area may be incomplete. This top may be completed by a member 48. Member 48 includes a pair of opposite upstanding members 49 which bear a plurality of rods 50 and 51 therewithin. Members 49, other than the height thereof, are identical in construction to support members 12 and rods 50 and 51 are secured therewithin by means of the same type of structure previously described in connection with FIGS. 6 through 10.

According to this invention adjacent modular units can be joined together in side by side relationship as shown in FIG. 4. For this purpose there is provided a connector clip 52 which is specially constructed to utilize the pins 28 projecting from the end caps 24 to achieve the side-by-side connection. As best shown in FIG. 2 clip 52 includes a substantially flat plate 53 which is provided with two holes for receiving pins 28 projecting from the end caps 24 of the appropriate support members in the modular units to be joined. The holes 54 are separated by an upstanding substantially V-shaped portion 55. As shown in FIG. 5 the V-shaped portion 55 fits between adjacent support members 12 with the body 53 extending across the end caps thereof. The V-shaped portion 55 acts to align the holes 54 in body 53 with the pins 28. The V-shaped portion also acts to maintain afixed spacing between adjacent support members. It is noted that the clip 52 while permitting the assembly of modular units in side-by-side relationship will also permit other units to be assembled in a vertically stacked relationship as shown in FIG. 4 and 5.

We claim:
1. In a filing rack, a joint structure comprising:
 a. a hollow support member having two pairs of aligned openings with one pair of aligned openings being disposed in overlying relationship with respect to the other pair of aligned openings;
 b. a rod-like member extending through each pair of aligned openings, each rod-like member having a pair of spaced apart grooves located interiorly of the support member; and
 c. locking means disposed within the support member and cooperatively engaging both grooves in each rod element for retaining the rod-like members in place relative to each other and relative to the support member.

2. The joint structure according to claim 1 wherein said locking means comprises:
 a. a shackle element having:
  a. a bridge portion overlying the rod-like elements; and
  b. a pair of leg portions depending downwardly from opposite ends of the bridge portion with each leg portion engaging one groove of each rod-like member in mating relationship thereto.

3. The joint structure according to claim 2 wherein the pairs of aligned openings in the support member are oriented in intersecting relationship relative to each other.

4. The joint structure according to claim 3 wherein:
 a. the pairs of aligned openings in the support member are oriented in substantially perpendicular relationship with respect to each other; and b. each groove in each rod-like member has a generally V-shape with the included angle between the faces of the V being approximately 90°; and c. said support member has a generally square cross-sectional configuration; and d. said bridge portion of the shackle element extends diagonally relative to the support member.

5. The joint structure according to claim 4 wherein the distance between the grooves in each rod-like element is approximately equal to the distance between the inner surfaces of opposite sides of the square support member.

6. The joint structure according to claim 5 further including:

a. a cap member mounted on the end of the support member;

b. a hole in the cap member; and c. a pin member disposed in tight fitting relationship within said hole; said pin member projecting from said cap member beyond the end of the support member whereby its projecting portion is adapted for insertion into the hole in an abutting cap member of another support member of the rack arranged in vertically stacked relation with respect to the first mentioned support member.

7. The joint structure according to claim 6 wherein the end of each rod lies substantially flush with the external surface of one side of the support member.

8. The joint structure according to clam 7 further including;

a. connecting means for coacting with the pin members projecting from the ends of adjacently located support members of the rack for securing said adjacently located support members together in side by side relationship.

9. The joint structure according to claim 8 wherein said connecting means comprises a. a connector clip having 1. a substantially flat plate member adapted to overlie the cap members of said adjacently located support members; and 2. a pair of spaced holes in the plate member registering with the holes in the cap members of the adjacently located support members, said holes being adapted to receive the pin members projecting form said holes in said cap members.

10. The joint structure according to claim 9 wherein:

a. said connector clip includes a V-shaped portion upstanding from the plate member at a point located midway between said holes in the plate member, said V-shaped portion being adapted to fit between said adjacently located support members.

* * * * *